United States Patent [19]

Medlin et al.

[11] 4,037,856
[45] July 26, 1977

[54] LATERAL FORCE LIMITING COUPLER ASSEMBLY

[75] Inventors: Eric G. Medlin; Stephen A. Blair; Richard H. Dennis, all of Tempe, Ariz.

[73] Assignee: U-Haul International, Inc., Phoenix, Ariz.

[21] Appl. No.: 690,140

[22] Filed: May 26, 1976

[51] Int. Cl.² .............................................. B60D 7/00
[52] U.S. Cl. ................................ 280/446 B; 188/112; 280/488
[58] Field of Search ................. 280/488, 432, 446 B; 188/112

[56] References Cited

U.S. PATENT DOCUMENTS

| | | | |
|---|---|---|---|
| 734,055 | 7/1903 | Gardiner | 280/488 |
| 2,630,888 | 3/1953 | Fikse | 188/112 |
| 2,786,554 | 3/1957 | Yadro | 188/112 |
| 2,993,568 | 7/1961 | Henry | 188/112 |
| 3,058,548 | 10/1962 | Stair | 188/112 |
| 3,141,529 | 7/1964 | Hart | 188/112 |
| 3,144,101 | 8/1964 | Hahn | 188/112 |
| 3,191,967 | 6/1965 | Penk | 280/488 X |
| 3,288,240 | 11/1966 | Franzel | 180/82 |
| 3,311,390 | 3/1967 | Rendessy | 280/504 |
| 3,394,949 | 7/1968 | Gearhart | 280/146 |
| 3,527,324 | 9/1970 | Butler | 188/112 |
| 3,566,987 | 3/1971 | Franzel | 180/103 |
| 3,647,032 | 6/1970 | Dombeck | 188/112 |
| 3,715,003 | 2/1973 | Jubenville | 180/103 |
| 3,722,919 | 3/1973 | Herbert | 280/432 |
| 3,790,807 | 2/1974 | Rossigno | 303/7 |
| 3,810,521 | 5/1974 | Sparr | 180/103 |
| 3,833,928 | 9/1974 | Gavit | 340/52 R |
| 3,834,767 | 9/1974 | Bullinger | 303/7 |
| 3,871,686 | 3/1975 | Rendessy | 280/446 B |
| 3,880,263 | 4/1975 | Ewald | 188/112 |
| 3,881,577 | 5/1975 | Wherry | 188/112 |
| 3,892,296 | 7/1975 | DePuydt | 188/112 |
| 3,948,544 | 4/1976 | Presley | 188/112 X |
| 3,948,567 | 4/1976 | Kasselmann | 303/7 |
| 3,953,084 | 4/1976 | Pittet | 303/24 R |
| 3,972,543 | 8/1976 | Presley | 188/112 X |

*Primary Examiner*—Joseph F. Peters, Jr.
*Assistant Examiner*—R. Schrecengost
*Attorney, Agent, or Firm*—David H. Semmes; Warren E. Olsen

[57] ABSTRACT

A coupler assembly for limiting lateral forces which may be generated during the highway operation of a trailer coupled to a towing vehicle. The present invention is part of the yoke of the trailer, and comprises a completely self-contained system for momentarily actuating the brakes on the towed vehicle, in response to undesirable lateral accelerations of the towed vehicle. The invention is characterized by a coupler member which itself is relatively rotatable, in a lateral plane, with respect to the trailer yoke, together with dampening spring assemblies, so there is a surge-brake actuation in response to lateral accelerations above a predetermined magnitude.

14 Claims, 3 Drawing Figures

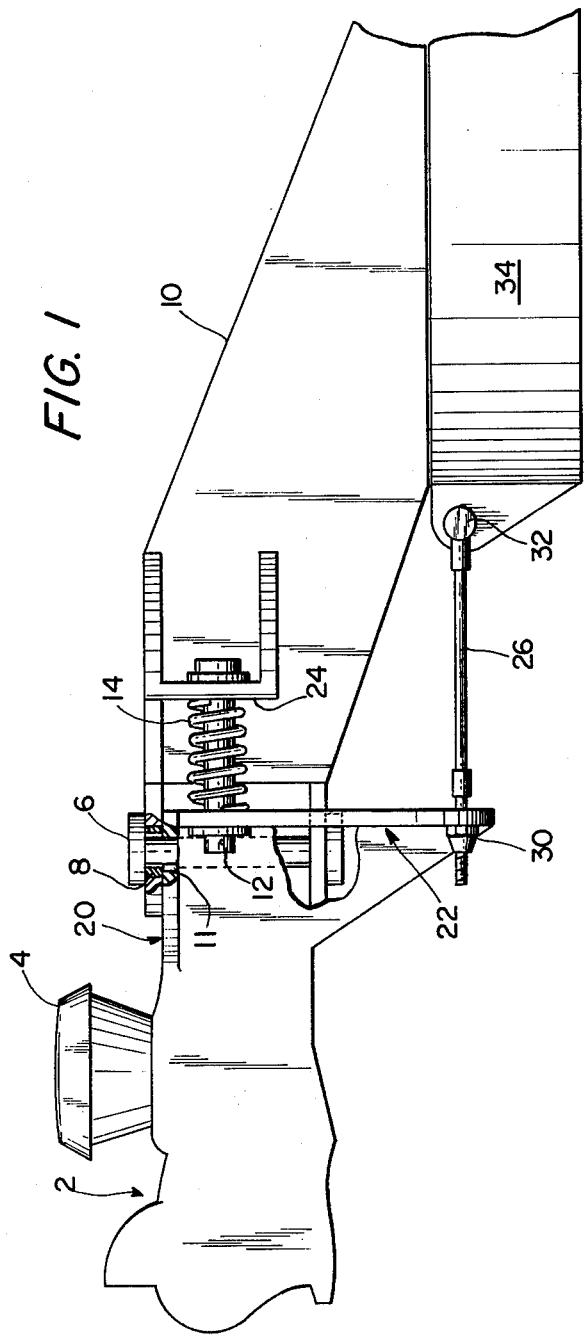
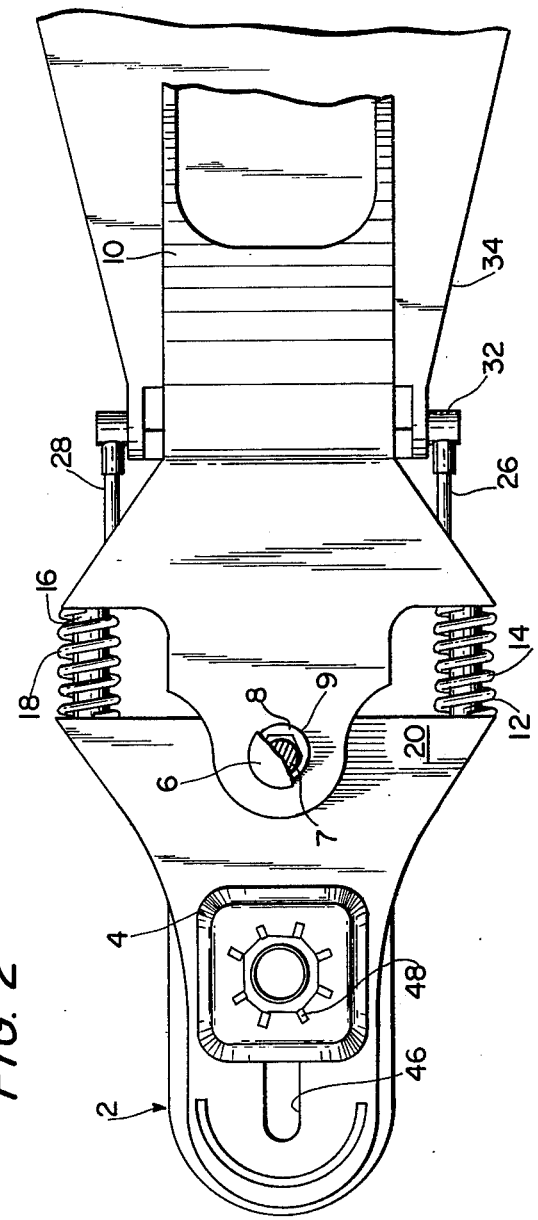

LATERAL FORCE LIMITING COUPLER ASSEMBLY

BACKGROUND OF THE INVENTION

1. Field of the Invention

This invention relates to a mechanism which will sense the lateral forces which act upon a trailer tongue coupler. The present invention is a type of surge-bake control for applying the brakes of a towed vehicle, such as a trailer, independent of the application of the brakes of the towing vehicle. The present invention teaches a mechanism which will respond to lateral, or sideways, accelerations of the trailer, to momentarily apply the trailer's brakes to preclude further instabilities, such as are known to affect straight line motion of certain trailed vehicles.

Trailer towing involes the mating of a towing vehicle to the towed vehicle, such that there is essentially an articulated vehicle combination. For safety, large trailers require separate braking systems, to assist in the slowing down of the total articulated combination. As is known, most trailer brake systems either involve separate connections with the towing vehicle, or are of the surge-type, which operate independently of, but are synchronized with, the braking of the towing vehicle.

The present invention responds only to lateral forces and is of the surge type in that it comprises a selectively actuated brake actuator which requires no mechanical or other type of interconnection with the towing vehicle or the braking system of the towing vehicle. The lateral force limiting coupler assembly taught herein is a mechanism which will sense and respond to sideways or lateral forces which may be dynamically generated during the towing of a trailer. Dynamic instabilities may become a serious hazard. A lateral acceleration gain of a trailer, wherein it yaws to the left and the right of the center line of travel, may produce sudden instabilities of the articulated combination of the towing vehicle and the trailer, with resultant loss of control of the combination by the driver.

It is significant that the occurrence of lateral accelerations is an insidious phenomena. Severe yawing oscillations, once started, tend to reinforce themselves rather suddenly. The driver of a towing vehicle is oftentimes unaware at the outset of the first lateral accelerations and, therefore, is not able to apply corrective action well before external conditions may aggravate the problem.

It is known, for example, that an inexperienced driver may seriously aggravate the problem by applying the car brakes when a towed vehicle actually has begun to fishtail. However, an experienced towing vehicle operator will either accelerate to dampen out the lateral swing phenomena or selectively apply only the brakes on the towed vehicle, to apply a corrective reaction by the yawing motion. It should be remembered, that in articulated combinations having direct connection between the brakes of the towed vehicle and the brakes of the towing vehicle, an independent control for the towed vehicles brakes is available in the driver's compartment. Therefore, with such a separate control for the trailer's brakes available to the driver, he may selectively be able to apply only the trailer brakes to dampen out the onset of any oscillatory motion. However, even this form of correction necessarily requires that there be a trailer brake control within the driver's reach, as well as quick thinking on the part of the driver to selectively apply only the trailer's brakes.

A much different situation is presented when there is no such mechanical, electrical or hydralic interconnection between the brake systems of the towed vehicle and the towing vehicle. For example, in the rental of utility trailers, there is no practical way of installing a separate override for the trailer brake system within the reach of the driver of the towing vehicle. As has been discussed, surge-brakes are normally self-contained within the trailer, and will rely upon the inertia of the trailer to actuate the brakes of the towed vehicle independently, though in synchronism, with the deceleration of the towing vehicle. Yet, surge-brake devices are responsive only to a linear deceleration of the trailer. They are not selectively responsive to lateral forces, such as are developed before a towed vehicle becomes noticeably unstable. Therefore, there has existed a great need for a completely self-contained device on towed vehicles which will respond to lateral forces, without requiring any type of mechanical, electrical or hydraulic interconnection with the towing vehicle.

2. Description of the Prior Art

The prior art is replete with teachings on the application of brakes on a towed vehicle, both independently of the application of the towing vehicle's brakes, and in direct connection with the braking function in the towing vehicle. The approaches of the prior art to the energization of brakes on a towed vehicle can be more fully appreciated with reference to the following U.S. Pat. Nos.: EWALD, 3,880,263; RENDESSY, 3,871,686; BULLINGER, 3,834,767; GAVIT, 3,833,928; SPARR, 3,810,521; ROSSIGNO, 3,790,807; HERBERT, 3,722,919; JUBENVILLE, 3,715,003; DOMBECK, 3,647,032; FRANZEL, 3,566,987; BUTLER, 3,527,324; GEARHART, 3,394,949; RENDESSY, 3,311,390; FRANZEL, 3,288,240; HAHN, 3,144,101; HART, 3,141,529; STAIR, 3,058,548; HENRY, 2,993,568; YADRO, 2,786,554; FIKSE, 2,630,888.

In summary, none of these patents teach a lateral force limiting coupler assembly characterized by having a pivotable coupler on the trailer tongue yoke for momentarily resisting dynamic lateral forces. While various of these patents allege an anti-sway function through application of the trailer brakes, none of them teach a completely self-contained lateral force correction device without interconnections to the trailer ball or the towing vehicle's electrical or hydraulic systems.

The surge-brake actuator construction of Ewald teaches a construction represented as an improvement over the construction of the Dombeck patent. Neither of these surge-brake assemblies are responsive to lateral forces, and merely represent improved versions of conventionally known surge-brake controls.

The patent to Rendessy illustrates a type of mechanical directional control which relies upon frictional restraint between a flexible line connected to the vehicle's bumpers and a roller assembly on the front yoke. As such, this flexible tensioning member applies corrective moments upon the vehicle's bumper for directional correction, and not upon the automatic and intermittent application of a trailer brake assembly, as taught herein.

The patent to Bullinger illustrates a self-contained wheel driven hydraulic pump brake assembly for a trailer, also responsive only to a longitudinally slidable connection between the tractor and the trailer.

The patent to Gavit illustrates another type of direction control which requires the mounting of an electro-mechanical sensor directly on the hitch of the towing vehicle. As such, the device of Gavit requires permanent installation on the hitch of the towing vehicle, and does not amount to a self-contained lateral force limiting device on the yoke on the trailer.

Similarly, the anti-fishtail device of Sparr requires a suitable electrical interconnection between the hitch ball and a sensor assembly mounted thereupon. Additionally, the electro-mechanical device of Sparr requires a power supply, and the accessory mounting of an appropriate switch assembly on the hitch itself.

The patent to Rossigno also teaches an electrical braking system which needs to be interconnected with the towed vehicle, and in no way contemplates a self-contained device for responding to lateral accelerations.

The anti-jackknife device of Herbert represents merely another prior art device which is neither functionally or structurally related to the force limiting coupler assembly disclosed herein.

The patent of Jubenville illustrates a rear mounted trailer accelerometer which senses only actual fishtailing through a ferro magnetic ball which travels past electro-mechanical contacts. As such, Jubenville's system also requires an external power supply and calibration of the travel of the ferro magnetic balls within a rear mounted accessory sensing device.

The patent to Franzel illustrates another electrical acceleration detector for energizing both brakes of a fishtailing trailer. For this purpose, Franzel employs mercury switches, mounted on either side of the towed vehicle, together with a power supply, with coordination of all switches necessary to obtain proper operation. Again, Franzel's device requires an electrical connection with the towed vehicle, so that adjustment and corrective brake action can be initiated directly by the driver.

The patent to Butler is of common assignment with the present application, and represents various known elements comprising a trailer coupling surge brake mechanism. Of course, Butler's device exemplifies surge brake systems without the additional capability of lateral force actuation.

The patent to Gearhart illustrates another form of mechanical anti-sway control requiring a series of lines, connected through separate attachment to the towing vehicle's bumpers, in order to correct a fishtailing situation. Again, this patent, like the other cited patents requiring separate connection to the towing vehicle, illustrate, by contrast, the advantages of a lateral force limiting coupler assembly which is completely self-contained and adaptable to all towing vehicles without any modification whatsoever. The patent to Rendessy illustrates an early manner of hitch design for applying a corrective moment directly from the towing vehicle's rear bumper.

The earlier patent to Franzel is pertinent for his teaching of an automatic stability control means for selectively applying either the left or right brakes on the towed vehicle. Again, however, the electrical circuitry according to Franzel requires a series of electrical switches and separate electrical power supply together with an interconnection with the towing vehicle. By contrast, the present invention obtains a significant operational simplicity over those exemplary devices which respond only to fishtailing, and require separate interconnections between the trailer and the towing vehicle.

Significantly, the patents to Hart, Hahn, Henry, Yardo and Fikse exemplify various other forms of surge-brake assemblies which are disclosed to be capable of responding only to longitudinal inertial forces. As such, these patents further represent the state of the art for surge-brake assemblies; without the capability of applying a selective braking control on the trailer brakes in response to lateral accelerations of a trailer.

Finally, the patent to Starr represents another well-known form of electro-hydraulic brake actuation by a separate connection, between towing vehicle and the towed vehicle. Again, by contrast, the advantages inhering in avoiding such interconnections between the trailer and the towing vehicle, as disclosed herein, may be further appreciated.

SUMMARY OF THE INVENTION

The principle object of this invention is to provide a mechanism which will be completely self-contained upon the coupling yoke of a trailer vehicle. The invention is usable with a conventional ball hitch, without any modifications. According to the invention, this mechanism will sense the lateral forces which act at the tongue of a coupled trailer, or other form of towed vehicle, and momentarily and immediately apply a corrective braking action in response to the lateral acceleration of the trailer as it begins. In accordance with this primary object, there is taught a mechanism which will respond to any form of yaw inertia experienced by the towed vehicle, so that in all cases the mechanism has the capability of momentarily decelerating the trailer and, thereby, preventing the towed vehicle from becoming even slightly unstable.

Another object of the invention is to provide a mechanism, completely self-contained upon the towed vehicle, which has the inherent capability of warning the operator of the towing vehicle of a possible loss of control due to excessive speed.

A still further object of this invention is to provide a mechanism which will tend to automatically slow down the towed vehicle when there is an unappreciated risk of loss of control menacing the driver, due to excessive speed.

Further, it is an object of this invention to automatically alert the driver of the towing vehicle that the articulated vehicle is either cornering at too rapid a rate of speed, or attempting an excessively rapid directional change. A related and further object of this invention is to provide a mechanism which will automatically slow down the entire articulated vehicle, comprising the towing vehicle and towed vehicle, when the operator has inadvertently attempted a cornering maneuver at too rapid a rate of speed.

It is yet a still further object of the present invention to provide a completely self-contained mechanism on the yoke of a towed vehicle which will automatically have a dampening effect on oscillatory motions, in a lateral direction, as experienced by a towed vehicle during normal towing situations.

It is therefore, overall, an inclusive object of this invention to provide a self-contained mechanism upon a towed vehicle which will correct drive error and encourage significantly safer articulated vehicle operation.

BRIEF DESCRIPTION OF THE DRAWINGS

FIG. 1 is a schematic representation of a lateral force limiting coupler assembly shown, with partial section, in side view;

FIG. 2 is a schematic representation of the lateral force limiting coupler assembly in top view;

DETAILED DESCRIPTION OF THE PREFERRED EMBODIMENT

Figure 3:
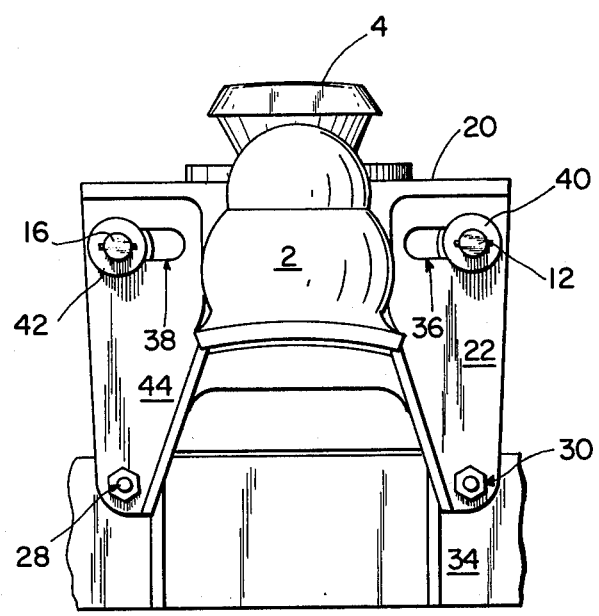
FIG. 3 is a schematic illustration of the lateral force limiting coupler assembly in front view.

FIG. 1 illustrates, schematically, a lateral force limiting coupler assembly according to the teachings of the present invention. It should be noted that this invention is intended for use upon any form of towed vehicle, and its primary purpose is to improve the safety level attendant to operating any form of articulated vehicle at motoring speeds. The present invention is based upon the principal that lateral forces are developed which can be sensed by a self-contained force limiting coupler assembly, without the need for interconnection with either the towing vehicle's brake system or various and sundry portions of the frame structure of the towing vehicle. The drawings illustrate the essential components of a lateral force limiting coupler assembly, and it is to be understood that the coupler assembly disclosed herein is intended to work in harmony with any form of surge-brake system as found on vehicles designed to be towed. Therefore, while not further illustrated, the present disclosure is to be understood to incorporate a conventional surge-braking system upon the towed vehicle in combination with the present invention, as will be more particularly described hereinafter.

With reference to FIG. 1, a conventional coupler 2 is schematically illustrated. The coupler portion 2 is designed to attach to an existing hitch ball, as is conventionally found for this purpose on towing vehicles. The coupler 2 further includes a handwheel 4 which, as is known, functions to tighten the coupler about the ball of the hitch on the towing vehicle. The handwheel 4 is tightened, by hand, to a position where the ball is securely lodged, against vertical disenlodgement, within the cooperating recess on the underside of the coupler 2.

As shown in FIG. 1, the present invention is significantly characterized by the provision of a pivot pin 6 which functions to allow the coupler 2 to rotate, in a horizontal or lateral plane, with respect to the trailer tongue 10. It can be seen that the pivot pin 6 therefore maintains the longitudinal orientation of the coupler 2 and the trailer tongue yoke 10, while allowing a relative rotation, in a lateral plane, between these two elements.

As illustrated by section FIG. 1, the pivot pin rests in a special vertical bushing 8 which itself is fastened rigidly to the yoke 10.

As shown in FIG. 2, the vertically secured bushing 8 has a semicircular semicular inner configuration disposed towards the hitch coupler, and a wedge inner configuration disposed in the direction of the trailer yoke. The mounting hole 9 is illustrated as circular and will include any form of keying means to ensure that the bushing 8 will not rotate with respect to the yoke 10.

The shaft of the pivot pin 6 is identified in section by number 7. It should be noted that the shaft 7 is free to rotate only when the yoke 10 is in tension with respect to the coupler 2. Consequently, on a normal straight line deceleration of the articulated vehicle combination, the yoke 10 will be urged against the pivot pin shaft 7; putting the wedge portion of bushing 8 in tight contact with pivot pin shaft 7. Because the wedged bushing 8 is fixed within the yoke 10, the yoke 10 is operable for a slight longitudinal movement with respect to the pin shaft 7. The pin shaft 7 is fixed within the coupler 2, for example, by a keyway 11 at flange 20 as shown in FIG. 1.

Therefore, it should be appreciated that a normal, straight-line deceleration will lock the yoke 10 against any possible rotation with respect to the coupler 2. However, when the yoke 10 is in tension with respect to the coupler 2, the pivot pin shaft 7 will be abutting the circular portion of bushing 8, thereby making relative rotation possible between the yoke 10 and the coupler 2.

With this pivot pin and bushing arrangement, it is clear that the pivot pin may further be easily adjusted for preselected tension between the trailer tongue yoke and the coupler assembly, and furthermore that it may be simply replaced, as necessary. The trailer tongue yoke 10 further includes a mounting surface for the interposition of left oscillation dampening spring 14, and right oscillation damping spring 18. Appropriate flanges, or damping spring platforms 24 on yoke 10 allow for the interposition of a left spring guide pin 12 and a right spring guide pin 16 between this portion of the yoke and the relatively pivotable coupler assembly 2.

As is further illustrated in FIG. 1, the present lateral force limiting coupler assembly significantly includes a vertical bushing plate flange, or resting platform 22 as an integral part of the pivotable coupler assembly 2. At the bottom of the resting platform 22 there is provided an aperture through which a left actuator 26 may be secured through the actuator adjustment nut 30. As shown in FIGS. 2 and 3, there is a symmetrically placed right actuator similarly positioned between the trailer tongue 34 and a vertical resting platform 44 on the pivotable coupler assembly.

Therefore, during normal towing operation, damping springs will resist rotation of the coupler 2 relative to the trailer tongue yoke 10, while yet allowing relative rotation between these members if sufficient lateral force is generated to overcome the spring rates of the oscillation damping springs 14 or 16. Therefore, the two oscillation damping springs 14 and 16 will limit the oscillatory behavior of the coupler in context with the trailer yoke. This oscillation damping arrangement also is inherently able to restrict the amount by which the coupler will ultimately be able to rotate, relative to the trailer yoke. As such, the present invention teaches the use of a pair of oscillation damping springs symmetrically placed about the pivot pin 6 to limit the rotational movement of the coupler 2; with a pivot pin wedging arrangement to maintain the coupler in longitudinal alignment with the center line of the trailer yoke, during reaction to forces which are substantially parallel to the longitudinal center line of the trailer yoke. In other words, the oscillation damping springs will normally maintain the longitudinal alignment of the coupler and yoke under relative tension conditions, with the further capability of resisting and dampening lateral oscillations as they arise.

For further appreciation of the functioning of the oscillation spring system taught herein, there is shown in FIG. 3 the distal end of the left spring guide pin 12, together with a left guide pin washer 40. As shown in FIG. 3, the washer 40 is larger than a laterally elongated left guide pin aperture 36. Therefore, upon relative rotation of the coupler 2, with respect to the trailer tongue yoke 10, the left spring guide pin 12 will be operably enabled to accommodate the relatively angular displacement of the coupler 2, without deformation of the guide pin 12. Similarly, the right spring guide pin 16 includes a form of guide pin washer 42 to allow for lateral movement of the distal end of the guide pin within the laterally positioned left guide pin aperture 38.

As further shown in FIG. 3, the resting platform 22, formed as a vertical flange on the coupler assembly 2, is illustrative of a similarly configured and symmetrically placed resting platform 44 for the right oscillation damping assembly. At the lower ends of left side resting platform 22 and right side resting platform 44, are interconnections for the distal ends of the respective actuators 26, which are flexible cables according to the invention. As shown in FIGS. 1 and 3, the left side actuator 26 includes an actuator adjustment nut 30 for securing the distal end of the actuator 26 onto the resting platform of the coupler assembly. The representative brake actuator 26 is connected, proximately, to trailer tongue 34 through the provision of an interconnection schematically illustrated at 32. This interconnection at 32 will be understood to represent a functional interconnection of the actuator 26 and the braking system of the towed vehicle.

It should be understood that the yoke 10 and the trailer tongue 34 schematically represent the main functioning elements of previously discussed conventional surge-brakes. As is manifest from the citation of prior art hereinbefore, surge-brake mechanisms conventionally include two members which move longitudinally to actuate a master cylinder for the trailer brakes. One of the members is the coupler yoke connected to the towing vehicle, and the other is part of the tongue of the trailer itself. For example, with reference to Butler U.S. Pat. No. 3,527,324, the yoke 10 of the present invention is functionally equivalent to the coupler body 15 in Butler. In like fashion, the tongue 34 of the present invention is functionally equivalent to the main body 32 in Butler. Of course, it should be understood that the present invention is readily adaptable to any conventional surge-brake mechanism, and further details of the surge-brake mechanism itself are unnecessary for a complete understanding of the present invention. It is significant that the present invention provides for an additional mode of actuation for a conventional surge-brake, without affecting the normal straight-line braking action allowed by the surge-brake.

The interconnection 32 allows for the length of cable 26 to be initially adjusted, so that it will be taut when the coupler and yoke are longitudinally aligned, as shown in FIG. 2. Similarly, the cable 28 will be rendered taut after the desired pre-load is placed upon the oscillation damping springs 14 and 16. In this respect, the actuator cables shown as 26 and 28 in FIG. 2 will have the capability to flex in order to allow the coupler to rotate in either direction, without compressive resistance from the cable which is not being subjected to tension. Therefore, actuators 26 and 28 are flexible connectors wherein a pulling force is exerted, by either of the cables, when placed in tension through the relative movements of the coupler 2 about the pivot pin 6. An adjustment nut as illustrated at 30 for left side actuator 26, will allow variable tensioning of each actuator cable to change sensitivity of the actuation as primarily dictated by the pre-load on springs 14 and 16.

Having now described this embodiment, the operation can be easily understood. A lateral acceleration of the trailer will be transmitted by the trailer tongue yoke 10, and tend to rotate the trailer tongue 10 about the pivot pin at 6. Any minor oscillatory forces will not be sufficient to overcome the tensioning of the respective oscillation damping springs 12 and 18, so that the adjustment of the spring rates in either oscillation damping assembly will control the point at which the yoke 10 will pivot with respect to coupler 2.

As has been discussed, the coupler assembly 2 is initially tightened upon the ball of a trailer hitch through the handwheel 4. As shown, the handwheel 4 may be preloaded upon the trailer hitch ball through a ratcheting passage over the spring clip at 46. The handwheel 4 includes detents 48 on its underside, so that once the handwheel is tightened downwardly over the vertically movable member 46, the preload of the coupler 2 on the trailer hitch ball will be maintained. This type of locking arrangement for a coupler upon the trailer hitch ball is conventional. With the coupler then securely engaging the trailer hitch ball, lateral forces transmitted through the trailer yoke 10 will cause the trailer yoke 10 to pivot about the center line represented by the pin 6. Upon such a relative lateral movement between the yoke 10 and the coupler assembly 2, one of the two brake actuator cables will be placed in tension, thereby momentarily urging the yoke 10 rearwardly with respect to tongue 34. Immediately, the trailer brakes will be applied. Both trailer brakes will be applied if either actuator is momentarily in tension, thusly decelerating the trailer. As only the trailer is momentarily decelerated, there is a concomitant straightening force experienced by the articulated vehicle combination. Because this actuation is momentary, and in direct response to lateral forces causing the yoke to pivot about the pivot point 6, the corrective braking force is instantaneously and selectively applied whenever the yoke is caused to pivot about the point pivot pin 6; without any intervention from either the operator of the towing vehicle or a signal from a brake system of the towing vehicle.

Furthermore, in addition to lateral force corrections during highway operation, the present system will also apply the brakes of the towed vehicle if the operator of the towing vehicle attempts to effect a turn at excessive speed. Because the spring rates of the respective damping springs 14 and 16 may be set at a certain threshold value, any excessive lateral force being applied about the pivot point 6 will function to momentarily actuate the towed vehicle's brakes. As the trailer is suddenly decelerated, the resultant tensile force exerted upon the hitch of the towing vehicle will be perceived by the driver, thereby warning him of a dangerous instability; which has already been corrected without his intervention.

While we have illustrated one embodiment of this invention, it is to be understood that the invention is to be solely limited by the scope of the appended claims.

We claim:

1. A lateral force limiting coupler assembly for a towed vehicle, operable for self-contained actuation of a surge-brake mechanism on said towed vehicle, comprising in combination:

A. a coupler member adapted for engagement with a mating hitch assembly on a towing vehicle; and, B. a yoke member comprising a movable actuator portion of said surge-brake mechanism, and a tongue member comprising a portion of the frame of said towed vehicle; and, C. connecting means between said coupler member and said yoke member for allowing relative rotation in a lateral plane between said coupler member and said yoke member; and D. dampening means between said coupler member and said yoke member for resisting said relative rotation; and E. actuator means between said coupler member and said tongue member operable to actuate the wheel brakes of said towed vehicle in response to said relative rotation.

2. The lateral force limiting coupler assembly of claim 1, wherein said connecting means further comprises a vertically disposed pivot pin between a laterally disposed bearing surface on said coupler member and a mating laterally disposed surface on said yoke member, wherein the centerline of said pivot pin is along the axis of said relative rotation in a lateral plane.

3. The lateral force limiting coupler assembly of claim 1, wherein said dampening means further comprises two dampening spring assemblies, between said coupler and yoke members, symmetrically positioned on either side of the axis of said relative rotation in a lateral plane.

4. The lateral force limiting coupler assembly of claim 3, wherein each of said dampening spring assemblies further comprises a guide pin and a surrounding compression spring, wherein said spring assemblies are positioned parallel to said plane of relative rotation.

5. The lateral force limiting coupler assembly of claim 4, wherein a proximate end of each of said guide pins is fixedly positioned on a dampening spring platform of said yoke member, and the distal end of said pin is mounted for a laterally slideable interconnection on a resting platform of said coupler member.

6. The lateral force limiting coupler assembly of claim 1, wherein said actuator means further comprises two actuators, between said coupler and tongue members, symmetrically positioned on either side of the axis of said relative rotation in a lateral plane.

7. The lateral force limiting coupler assembly of claim 6, wherein each of said actuators further comprise a flexible cable with a distal end adjustably attached to said coupler member, and a proximate end connected to said tongue member, whereby relative rotation of said coupler member will tension either flexible cable, and thereby actuate said surge-brake mechanism.

8. The lateral force limiting coupler assembly of claim 2, wherein said pivot pin is rigidly attached to said coupler member, and extended within a bearing means which is fixed within said yoke member.

9. The lateral force limiting coupler assembly of claim 8, wherein said bearing means further comprises a semicircular inner configuration disposed towards said coupler, and a wedge inner configuration disposed toward said yoke, whereby said pivot pin will be wedged when said yoke member and said coupler member are in relative compression.

10. The lateral force limiting coupler assembly of claim 7, wherein each of said actuator cables is disposed substantially parallel to the lateral plane of said relative rotation.

11. The lateral force limiting coupler assembly of claim 2, wherein said laterally disposed bearing surface on said coupler member is below the mating laterally disposed surface of said yoke member.

12. The lateral force limiting coupler assembly of claim 2, wherein said dampening means comprises two dampening spring assemblies, symmetrical about said axis of relative rotation, and said actuator means comprises two flexible cables symmetrical about said axis of relative rotation, wherein a vertically disposed flange on said coupler member adjustably connects the respective distal ends of said spring assemblies and said cables to said coupler member.

13. The lateral force limiting coupler assembly of claim 2, wherein said coupler means further includes bearing means to maintain said yoke member and said coupler member longitudinally aligned during relative compression; and allow relative rotation between said yoke member and said coupler member when said members are in relative tension.

14. The lateral force limiting coupler assembly according to claim 13, wherein said bearing means comprises a wedge shaped inner configuration on a bearing fixed to said yoke member, and a pivot pin extending within and operable for engagement against said inner bearing configuration.

* * * * *